(12) United States Patent
Dailey et al.

(10) Patent No.: US 7,871,064 B2
(45) Date of Patent: Jan. 18, 2011

(54) REPAIR FIXTURE

(75) Inventors: George F. Dailey, Pittsburgh, PA (US);
Michael T. O'Leary, Apollo, PA (US);
Wesley C. Ross, Jeannette, PA (US);
James P. Dock, Beaver Falls, PA (US);
Robert W. Nixdorf, Export, PA (US)

(73) Assignee: Siemens Energy, Inc., Orlando, FL (US)

( * ) Notice: Subject to any disclaimer, the term of this patent is extended or adjusted under 35 U.S.C. 154(b) by 569 days.

(21) Appl. No.: 11/583,290

(22) Filed: Oct. 19, 2006

(65) Prior Publication Data

US 2008/0093787 A1    Apr. 24, 2008

(51) Int. Cl.
*B25B 5/16* (2006.01)
*B66F 7/16* (2006.01)

(52) U.S. Cl. .................................... 269/269; 254/89 R

(58) Field of Classification Search ............... 254/89 H, 254/89 R, 133 R; 269/71, 902, 269; 29/281.5
See application file for complete search history.

(56) References Cited

U.S. PATENT DOCUMENTS

| | | | |
|---|---|---|---|
| 3,527,442 A * | 9/1970 | Korkut | 254/106 |
| 4,330,105 A * | 5/1982 | Gallagher | 254/89 R |
| 4,451,979 A | 6/1984 | Schuster | |
| 4,461,455 A * | 7/1984 | Mills et al. | 254/3 R |
| 5,360,177 A | 11/1994 | Lombardi et al. | |

* cited by examiner

*Primary Examiner*—Hadi Shakeri

(57) ABSTRACT

A repair fixture for supporting large cylindrical objects such as a generator rotor, to facilitate field maintenance operations. The fixture has two spaced Vee-blocks that are supported by and moved within vertical channels formed within peripheral stanchions. Clevises are rotatably connected at one end to both lateral sides of the Vee-block and at the other end to a hydraulic piston that is employed to raise and lower the Vee-blocks in unison to accommodate various maintenance requirements.

12 Claims, 3 Drawing Sheets

REPAIR FIXTURE

BACKGROUND OF THE INVENTION

1. Field of the Invention

This invention pertains generally to field repair fixtures, and more particularly to fixtures for supporting the rotor of an electric generator during field repair operations.

2. Related Art

Electric generator rotor field work is generally carried on on or near the turbine deck and typically involves moving the shrunk-on components, machining stress relief grooves, fits, elimination of turn-to-turn shorts, checking hydrogen seals, and reassembly of all the shrunk-on components. To accomplish this work, all machining and runout measurements are done in a Vee-block setup, where the centerline of the generator is approximately 52 inches (132.08 cm) off the floor. Keeping the centerline low has certain advantages in minimizing machining chatter during the heavy machining needed to enlarge rotor vent slots. Furthermore, all of the machining drive systems are set to operate at this approximate height. However, the power rollers, which are required for reassembling of the shrunk-on components operate with the rotor centerline approximately 63 (160.02 cm) inches above the turbine deck. This height difference has until now necessitated the transfer of the rotor from the Vee-blocks, to power rollers, to Vee-blocks, and then finally back to the power rollers. This involved using an overhead crane up to four times. Scheduling the crane, which was also required for removal/reassembly of the shrunk-on components added to delays in the refurbishment operation, which is costly.

Accordingly, a new electric generator repair fixture is desired that can minimize the use of the overhead crane in the course of refurbishment of a generator rotor.

Furthermore, a new electric generator rotor repair fixture is desired that can vary the height of the centerline of the rotor to accommodate different refurbishment operations.

Additionally, a new electric generator rotor repair fixture is desired that can make maximum use of existing components.

SUMMARY OF THE INVENTION

The foregoing objects are achieved by a new electric generator repair support fixture constructed in accordance with this invention that can vary the height of the centerline of the rotor to accommodate the various refurbishment operations. The repair fixture includes a plurality of spaced, parallel Vee-block supports having inclined upper surfaces defining a "V", with the nadir of the "V" shape of each Vee-block aligned along the same axis so that the generator rotor can be supported within the "V" groove. A stanchion is positioned on either side of each Vee-block that has a vertically oriented channel that receives an end of the Vee-block, so that the end of the Vee-block can translate vertically within the stanchion channel and be supported against movement in the other directions. A plurality of devises are rotatably attached at one end to either a front side or a rear side of each Vee-block with at least one clevis affixed proximate each lateral end of the Vee-block on the same side. A plurality of hydraulic or pneumatic cylinders, one associated with each clevis, is supported by the operations floor and has its piston connected to the clevis at the other end. Means are provided for activating the pistons in unison so that the Vee-blocks are raised or lowered at the same time and at the same rate to maintain a level support plane. In the preferred embodiment, the devises are attached to the Vee-blocks with a pin connection that permits them to rotate in a plane parallel to the vertical front surface of the Vee-block. Preferably, devises are provided on the front and back of the Vee-block proximate each of the lateral ends and aligned and connected at one end of the clevis through a pin connection that extends through the Vee-block and through both clevises. Desirably, adjoining devises are braced together at their other end.

In one preferred embodiment, the stanchions are anchored to a bedplate which also supports a cylinder bracket that fixes the cylinders in position. Preferably, the lateral ends of the Vee-blocks and/or the stanchion grooves are provided with grease fittings to lubricate the sliding mating surfaces of the Vee-blocks and stanchions. Desirably, the pistons have a 24 inch stroke and can lift the Vee-blocks approximately 19 inches.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
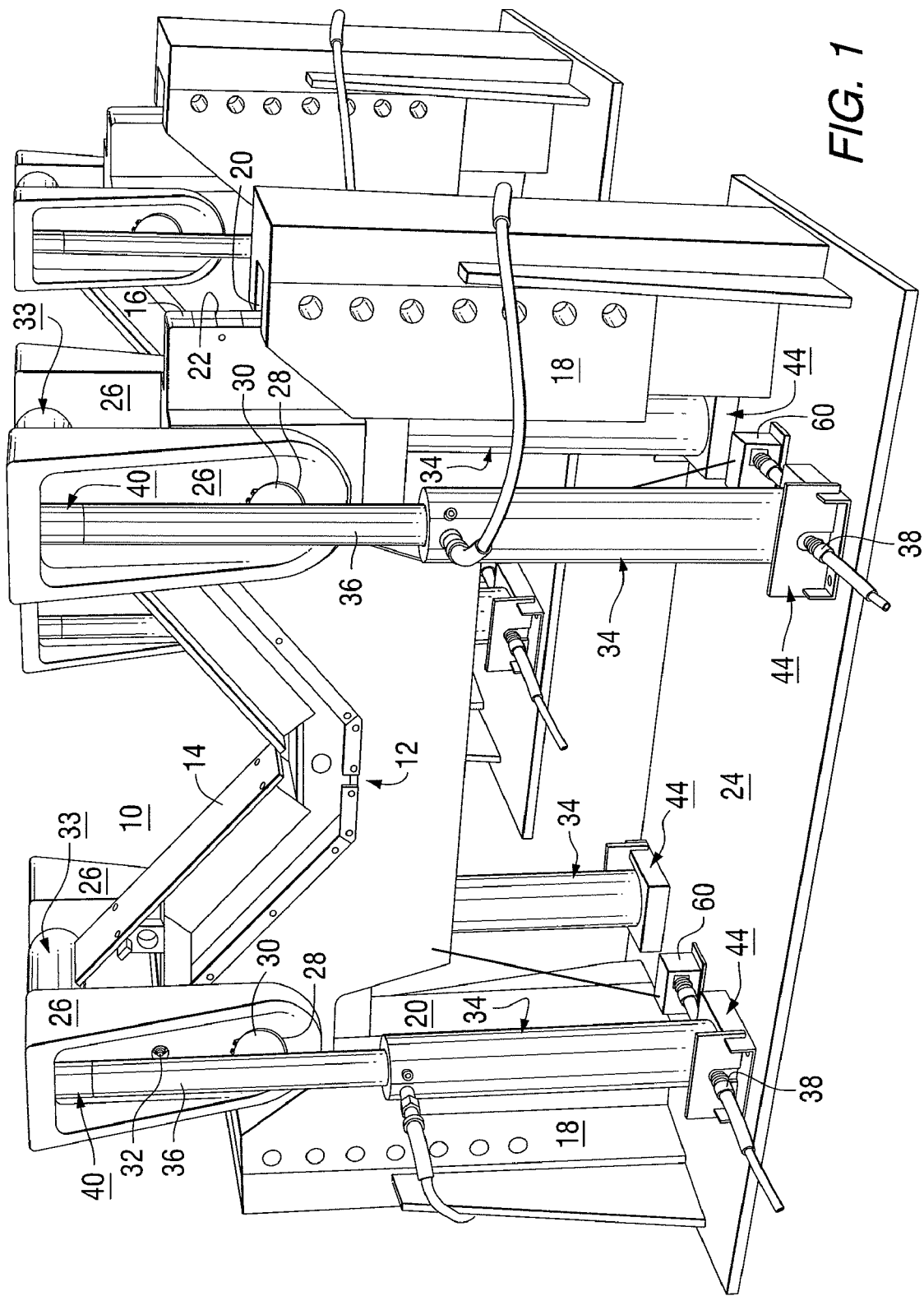
FIG. 1 is a perspective view of the support fixture of this invention.

FIG. 1 shows the support fixture 10 of this invention. Support for the generator rotor is provided by two Vee-blocks 12 spaced apart and aligned along the same axis so that the turbine rotor can be supported on the "V" surface 14 at each end of the rotor. The lateral ends 16 of the Vee-block 12 are supported within vertical channels 20 within the stanchions 18. The stanchions 18 are secured to a bedplate 24 by bolts or welding. The vertical grooves or channels 20 within the stanchions 18 permit the Vee-block 12 to move vertically while being confined in the other directions. The lateral ends of the Vee-block 16 are provided with grease fittings 22 to lubricate the opposing surfaces between the Vee-block 12 and the channel 20 as the Vee-block is moved vertically. Similarly, grease fittings can be provided within the channel 20 as well as an alternative to or in addition to the grease fittings at the ends of the Vee-blocks 16.

Figure 2B:
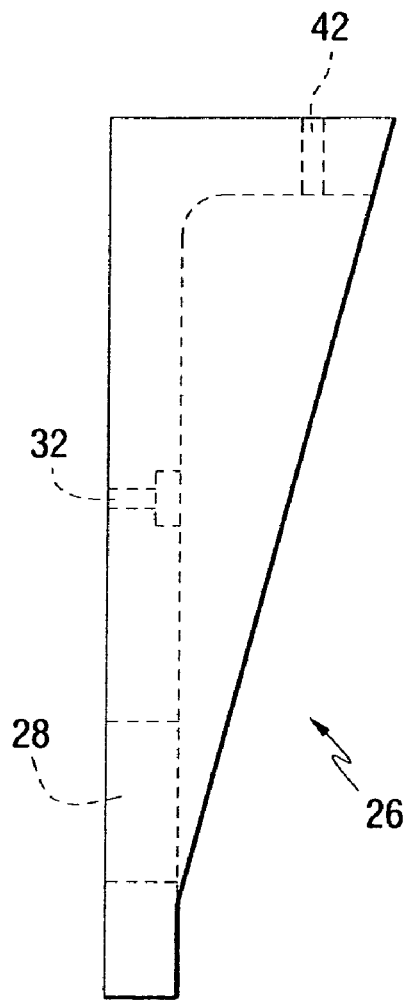
FIGS. 2A and 2B are respectively front and side views of the devises used in this invention.
Figure 2A:
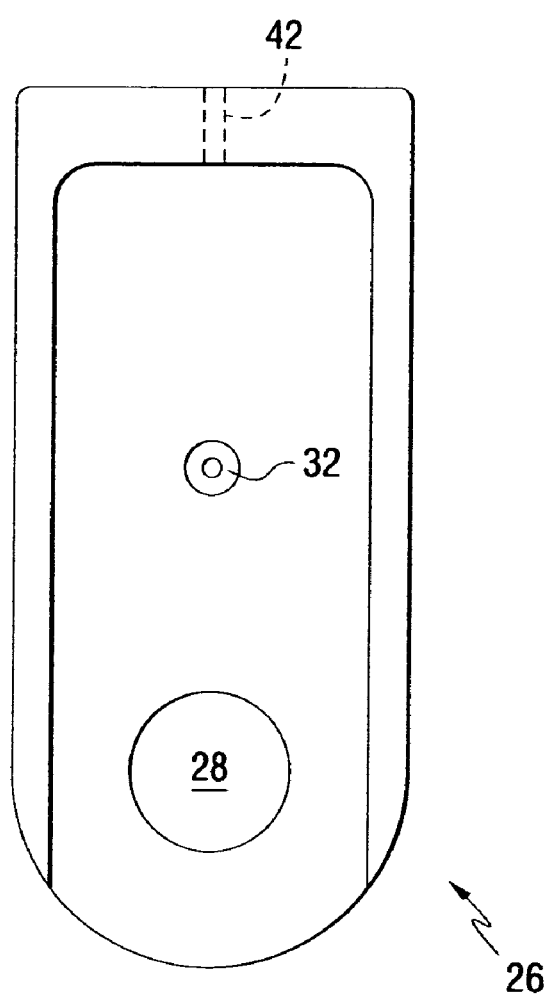

Clevises 26 are attached near their lower ends to a location on the Vee-block proximate the lateral ends 16, preferably on either side of the Vee-block. A pin hole 28 is drilled through the clevis and the Vee-block to create a pin connection that enables the clevis to rotate on a 17-4 PH stainless steel pin. The clevis can best be understood from FIG. 2. FIG. 2A shows a front view and FIG. 2B shows a side view of the clevis. In addition to the pivot hole 28, the clevis includes a locking pin hole 32. The pin 32, when in position, restrains the rotation of the clevis. A hole 42 is placed in the top lip of the clevis and accommodates a bolt which is screwed into the top of a hydraulic cylinder piston 36 shown in FIG. 1. The hydraulic cylinder 34 imparts vertical motion to the Vee-block 12 through the clevis connection for positioning the generator rotor at the appropriate height for the maintenance operation. Preferably four devises are provided per Vee-block; two on either side of the Vee-block end 16. The two opposing devises are braced by a pipe 33 that extends between the opposing devises 26 and is secured to their opposing sides. The pipe spacer 33 keeps the devises from applying an additional bending movement to the 17-4 shear pin 30.

Figure 3:
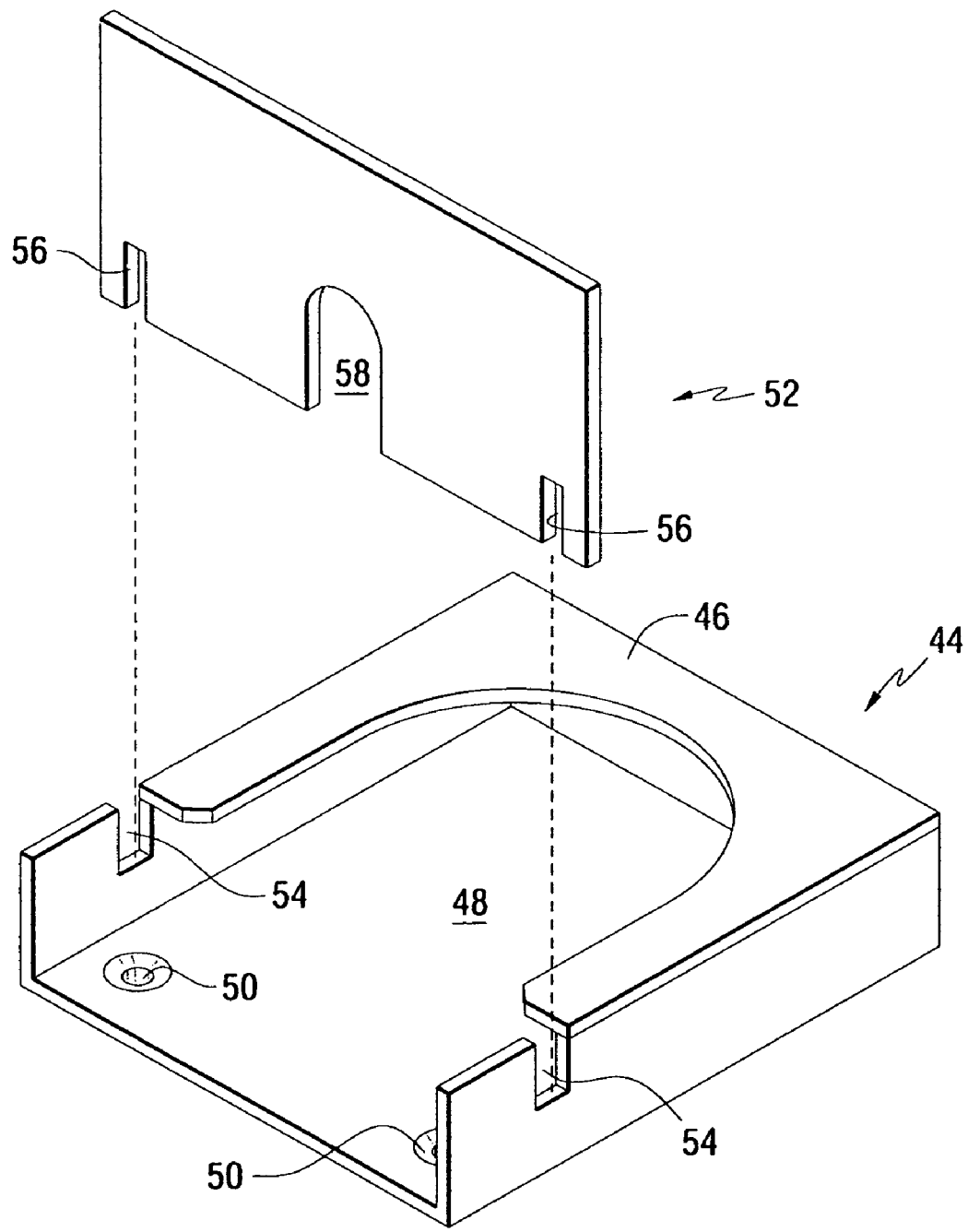
FIGS. 3 is a perspective view of the cylinder bracket employed in this invention.

In the arrangement shown there are four 50 ton, 24 inch stroke, double acting hydraulic cylinders per Vee-block. Such hydraulic cylinders are available from ENERPAC Company, Milwaukee, Wis. The hydraulic cylinders 34 are secured against movement by a cylinder bracket 44 that is bolted to the bedplate 24 at a location to align the hydraulic cylinder piston 36 with the lip of the clevis 26. The cylinder bracket 44 is best illustrated in FIGS. 3A and 3B. The bracket 44 includes a base 46 that has a recess 48 into which the base of the cylinder 34 is fitted. The slots 56 in the back plate 52 are then slid over the slots 54 in the base 44 in an interleaved fashion to anchor the base of the hydraulic cylinder 34 in position. A slot 58 in the back plate rides over and accomodates the hydraulic fitting 38.

All of the machining and runout measurements are performed with the rotor supported in the Vee-block fixture, heretofore described, with the centerline of the generator positioned at approximately 52 inches off the floor. When the power rollers are employed for reassembly of the shrunk-on components, the hydraulic cylinders 34 raise the rotor centerline to approximately 63 inches above the turbine deck. The ENERPAC "Synchronous Lift System" is employed to safely and uniformly lift the rotor high enough, approximately 19 to 21 inches (48.26 to 53.34 cm), so that the power rollers can be installed/removed as required. The ENERPAC "Synchronous Lift System" employs two position sensors 60 connected to each Vee-block, that are used to control solenoid valves so that all eight cylinders move up at exactly the same rate within 0.014 inches (0.036 cm) of each other. An aluminum spacer 40 is provided at the end of each piston 36 so that the piston can be fully retracted within its corresponding cylinder when the Vee-block 12 is in the lower most position. When the Vee-block is in the lower most position, the pistons 36 can be disconnected from 30 the devises 26 so that the devises can be rotated into the horizontal position. This lowered condition is required as clearance for the retaining ring as it is removed from the rotor with the Vee-block assembly resting on the bedplate 24.

Thus, many of the various maintenance operations that need to be performed to the rotor during field refurbishment can be accomplished with the fixture of this invention without removing the rotor from the fixture. While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to given the full breadth of the appended claims and any and all equivalents thereof.

What is claimed is:

1. A repair fixture for supporting large cylindrical objects, such as a generator rotor, for disassembly, assembly and/or machining, that can vary the height of a centerline of the cylindrical object to accommodate various operations comprising:

a plurality of spaced, parallel Vee-block supports having inclined upper surfaces defining a "V" with the nadir of "V" shape of each Vee-block aligned along the same axis so that the cylindrical object can be supported within the "V" groove;

a stanchion positioned on either side of each Vee-block having a vertical groove that receives an end of the Vee-block so that the end of the Vee-block can translate vertically within the stanchion groove and be supported against movement in other directions;

a plurality of devises rotatably affixed at a lower end respectively to a front side and a rear side of each Vee-block at each end of the Vee-block, so the clevises at each end are opposed to each other with the clevises at each end that are opposed being attached to each other at an upper end of the clevises with a brace therebetween to maintain the upper end of the devises spaced apart;

a plurality of hydraulic or pneumatic cylinders each having a piston with an end of each piston connected to an upper end of the corresponding clevis, which upper end is spaced from the lower end, and with an end of the cylinder supported by a floor; and means for activating the pistons in unison so that the Vee-blocks are raised or lowered at the same time and at the same rate to maintain the cylindrical object level.

2. The repair fixture of claim 1 wherein the clevis is affixed to the Vee-block through a pin connection.

3. The repair fixture of claim 2 wherein the clevises on the same end of each Vee-block are aligned and coupled together through the same pin connection that extends through the Vee-block.

4. The repair fixture of claim 1 wherein the clevis is removeably attached to the piston.

5. The repair fixture of claim 1 wherein the means for activating the pistons in unison includes two position sensors connected to each Vee-block.

6. The repair fixture of claim 1 including a bedplate that the stanchions are anchored to once the Vee-blocks are aligned.

7. The repair fixture of claim 6 including a cylinder bracket affixed to the bedplate at each location where the cylinder is supported by the floor to hold the cylinder in proper position.

8. The repair fixture of claim 1 including a cylinder bracket stationarily affixed at each location where the cylinder is supported by the floor to hold the cylinder in proper position.

9. The repair fixture of claim 1 including a grease fitting within each vertical groove in each stanchion to assist smooth vertical translation of the V-block.

10. The repair fixture of claim 9 including a grease fitting within the end of each Vee-block.

11. The repair fixture of claim 1 wherein the piston further includes a spacer such that the piston is not fully retractable into the cylinder.

12. The repair fixture of claim 1 wherein the piston has approximately a 24 inch stroke and can lift the cylindrical object approximately 19 inches.

* * * * *